United States Patent
Seeland et al.

(10) Patent No.: US 12,304,560 B2
(45) Date of Patent: May 20, 2025

(54) METHOD FOR OPERATING A MOTOR VEHICLE

(71) Applicant: Volkswagen Aktiengesellschaft, Wolfsburg (DE)

(72) Inventors: Jana Seeland, Wolfsburg (DE); Bastian Göricke, Wolfsburg (DE); Markus Radimirsch, Uetze (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 330 days.

(21) Appl. No.: 17/476,241

(22) Filed: Sep. 15, 2021

(65) Prior Publication Data
US 2022/0081032 A1    Mar. 17, 2022

(30) Foreign Application Priority Data
Sep. 15, 2020  (DE) ..................... 10 2020 211 548.6

(51) Int. Cl.
*B62D 15/02* (2006.01)
*B62D 5/04* (2006.01)

(52) U.S. Cl.
CPC ....... *B62D 15/0285* (2013.01); *B62D 5/0463* (2013.01)

(58) Field of Classification Search
CPC .......................... B62D 15/0285; B62D 5/0463
See application file for complete search history.

(56) References Cited

U.S. PATENT DOCUMENTS

| | | | | |
|---|---|---|---|---|
| 9,371,089 B2 * | 6/2016 | Werling | ............... | B62D 15/025 |
| 10,399,595 B2 * | 9/2019 | Moretti | ................... | B62D 1/28 |
| 2002/0161520 A1 * | 10/2002 | Dutta | ..................... | G01C 21/26 342/357.31 |
| 2007/0282502 A1 * | 12/2007 | Bayer | ................. | B62D 15/028 701/42 |
| 2010/0019935 A1 * | 1/2010 | Kawabata | ............ | B62D 15/028 340/932.2 |
| 2013/0124041 A1 * | 5/2013 | Belser | ................... | G08G 1/168 701/41 |

(Continued)

FOREIGN PATENT DOCUMENTS

| | | | | |
|---|---|---|---|---|
| DE | 102004055584 A1 | | 7/2005 | ............. B62D 15/02 |
| DE | 102005017360 A1 * | | 11/2005 | ............. B60Q 9/004 |

(Continued)

OTHER PUBLICATIONS

DE102005017360A1 machine translation (Year: 2005).*

(Continued)

*Primary Examiner* — Todd Melton
*Assistant Examiner* — Oliver Tan
(74) *Attorney, Agent, or Firm* — Slayden Grubert Beard PLLC

(57) ABSTRACT

A method for operating a motor vehicle in a parking procedure is provided, wherein the motor vehicle comprises at least one parking assistance function. The method comprises signaling an availability of support by the parking assistance function by at least temporary actuator-based application of at least one perceivable steering torque, wherein the steering torque is applied as an additional steering torque that acts in the direction of a parking space.

15 Claims, 1 Drawing Sheet

(56) References Cited

U.S. PATENT DOCUMENTS

| | | | | |
|---|---|---|---|---|
| 2014/0172235 A1* | 6/2014 | Werling | ................ | B60W 30/12 |
| | | | | 701/41 |
| 2016/0371983 A1* | 12/2016 | Ronning | ............. | B62D 15/027 |
| 2017/0075701 A1* | 3/2017 | Ricci | ..................... | G06F 3/0637 |
| 2017/0106903 A1* | 4/2017 | Moretti | ................ | B62D 5/0472 |
| 2017/0334446 A1* | 11/2017 | Bosch | .................. | B60W 50/10 |
| 2019/0172272 A1* | 6/2019 | Wang | ..................... | G08G 1/147 |

FOREIGN PATENT DOCUMENTS

| | | | | |
|---|---|---|---|---|
| DE | 102014005380 A1 * | 9/2014 | ......... | B62D 15/0275 |
| DE | 102013214660 A1 | 1/2015 | ............ | B60W 10/04 |
| DE | 102014115334 A1 | 4/2016 | ............ | B60W 30/06 |
| DE | 102017202468 B4 * | 9/2018 | ............ | B60W 10/20 |
| DE | 102018105649 A1 * | 9/2019 | ......... | B62D 15/0285 |
| DE | 102019005180 A1 | 1/2020 | ................ | B60T 7/12 |
| DE | 102018215525 A1 | 3/2020 | ............ | B60W 10/04 |
| EP | 1777143 B1 * | 11/2009 | .......... | B60W 30/143 |
| EP | 2748052 B1 | 3/2016 | ............ | B60W 10/18 |
| EP | 3581464 A1 | 12/2019 | ............... | B62D 1/04 |
| JP | 2015214225 A | 12/2015 | ............. | B60R 21/00 |

OTHER PUBLICATIONS

DE-102017202468-B4 espacenet machine translation.*
German Office Action, Application No. 102020211548.6, 5 pages, Feb. 24, 2021.
Extended European Search Report, Application No. 21194557.1, 8 pages, Jan. 27, 2022.
Chinese Office Action, Application No. 2021110796972, 11 pages, Nov. 29, 2024.

\* cited by examiner

METHOD FOR OPERATING A MOTOR VEHICLE

CROSS-REFERENCE TO RELATED APPLICATIONS

This application claims priority to German Patent Application No. DE 10 2020 211 548.6, filed on Sep. 15, 2020 with the German Patent and Trademark Office. The contents of the aforesaid Patent Applications are incorporated herein for all purposes.

TECHNICAL FIELD

The invention relates to a method for operating a motor vehicle and to a motor vehicle. In particular, the invention relates to haptically indicating or signaling the availability of support via a parking assistance function. The motor vehicle may for example be a passenger car or a truck.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Currently, vehicles in which a driver may be assisted in an at least partially autonomous manner during a parking procedure are available on the market. For example, autonomous transverse guidance (i.e., steering) of vehicles within the scope of a parking procedure is known. There are also solutions in which autonomous longitudinal guidance is additionally possible and/or in which the driver merely has to actuate a gearshift but the steering and acceleration during the parking procedure is carried out autonomously of the driver.

Typically, a driver activates a parking place search or directly activates the parking assistance function, in response to which the vehicle searches for free parking spaces by means of environment sensors. If a free parking space is identified, this is signaled to the driver visually and/or via audio output. Depending on the active parking assistance function, the driver may have the parking procedure carried out in an at least partially autonomous manner.

However, the visual and/or acoustic signaling risks distracting the driver from the traffic. In addition, the driver cannot always establish with certainty whether they are being shown that a parking space has been identified or whether support via a parking assistance function is actually available.

SUMMARY

There is therefore a need to improve operation of a motor vehicle having a parking assistance function.

The need is addressed by the subject matter of the attached independent claims. Embodiments of the invention are described in the dependent claims, the following description, and the drawings.

DESCRIPTION

Figure 1:
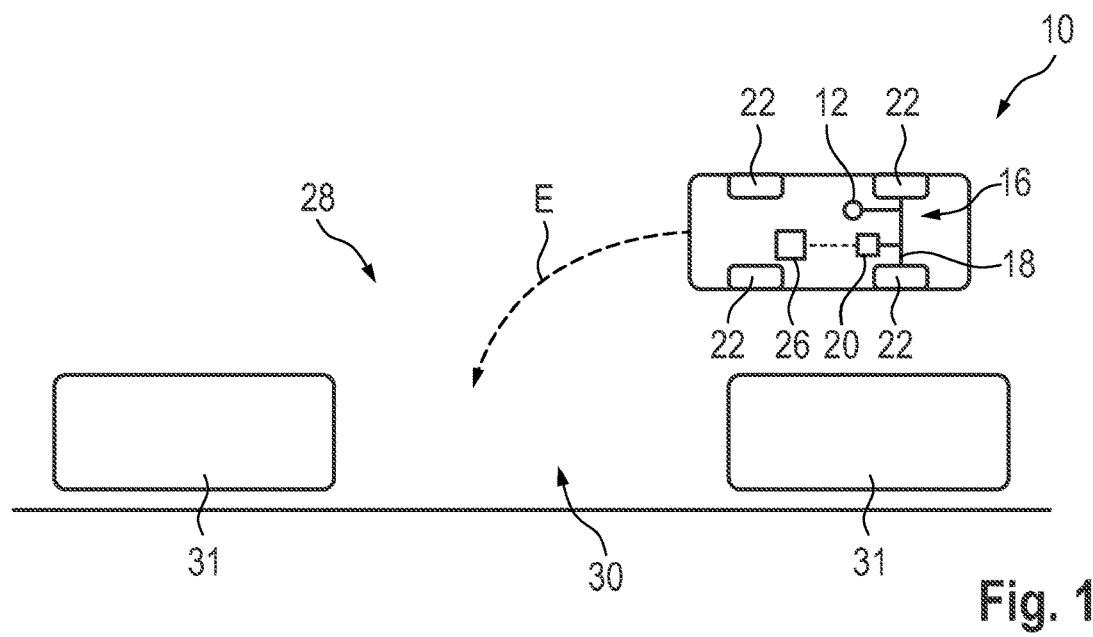
FIG. 1 shows an exemplary embodiment of a motor vehicle, which is configured to carry out a method for a parking procedure.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, an intuitive indication (i.e., signaling) of the availability of a parking assistance function is provided in a manner that distracts the driver as little as possible.

Some embodiments provide for the availability of the support via a parking assistance function (in short: the availability of a parking assistance system) to be indicated by means of haptic feedback via a steering handle. Acoustic and/or optical (visual) signals may additionally be output, but this is not strictly necessary. Furthermore, the probability of the driver no longer perceiving any optical or visual signals as the primary indication of availability is increased and/or the probability of the driver being distracted from the surrounding traffic is low on account of the haptic feedback on the steering handle.

In other words, some embodiments propose an at least temporary actuator-based (i.e., driver-autonomous) application of a steering torque that may be perceived on a steering handle. The steering torque may for example be generated in a pulse-like, jerky, or jolt-like manner.

For example, a method for operating a motor vehicle for (or during) the performance of a parking procedure is proposed, wherein the motor vehicle comprises at least one (for example at least partially autonomous) parking assistance function and wherein the method comprises:

signaling (or indicating, for example haptically indicating, or notifying of) an availability of support via the parking assistance function by means of at least temporary actuator-based application of at least one steering torque that may be perceived on a steering handle.

Furthermore, the steering torque may be applied as an additional steering torque that acts in the direction of a parking space.

In other words, the additional steering torque may be directed such that and/or act in such a direction that the vehicle may be steered toward the parking space, i.e., may be parked therein. The additional steering torque may in some embodiments reduce the steering resistance and/or actively move a steering handle.

In some embodiments, at least the direction of the steering torque applied by means of actuators is not necessarily dependent on the surrounding situation, for example. However, the magnitude of the additional steering torque may be predetermined and independent of the situation, such that it may be recognized by the vehicle driver as identification of the availability or activity of the parking assistance function. For example, in this context, the additional steering torque may be applied accordingly irrespective of the situation at least when steering in for the first time to drive into the parking space, but after that (for example after a predefined time interval) it may be adaptable depending on the situation.

The additional steering torque may in some embodiments also act independently of whether the driver has themselves already started to generate manual steering torques. The term "additional steering torque" implies that it is, in principle, intended to act even in the event of manually generated steering torques and for example in addition thereto or to enable a desired steering action (for example toward the parking space) in addition thereto or together therewith.

When reference is made herein to the indication of the availability, this does not necessarily have to be interpreted as visual indication, but rather accordingly as haptic indication or signaling via a steering torque that may be perceived by the driver.

The parking assistance function may for example be a function of the type mentioned above, according to which the motor vehicle (in the following also referred to simply as vehicle) is transversely and/or longitudinally guided autonomously of the driver. However, it may also for example be a parking assistance function in which the driver is assisted by means of the application of additional steering torques, for example by means of the merely temporary application of additional steering torques, for example about turning points (or steering points). A steering resistance, for example, may be adapted in a targeted manner by means of additional steering torques, which may be perceived by the driver as a steering hint.

In a manner known per se, the parking assistance function may be provided by a control circuit, also referred to as 'control unit' herein. It is stored therein in the form of a software application or program code which prompts the control circuit to provide the functions described herein when executed by a processor of the control circuit.

The availability of (driver or parking) assistance may then for example be provided by the parking assistance function when the parking assistance function is activated. Availability may further involve specific system limits or conditions, which enable support via the parking assistance function, to be complied with. In some embodiments, as a separate step, it may be ascertained whether availability exists.

The method may also in some embodiments detect a driver's desire to park and/or the start of a parking procedure as a separate measure. For this purpose, it may for example be determined that a parking space was recognized by means of known approaches from the prior art. If the driver then stops the vehicle and/or engages a reverse gear, it may be concluded that a parking procedure has begun or that the driver wishes to park. Then, the availability of the parking assistance function may be checked and this may be indicated to a driver. In principle, the availability of the parking assistance function may for example be signaled in the manner described herein as early as immediately after recognition of a parking space and the parking assistance function may then be activated when the driver stops the vehicle and for example engages a reverse gear.

The actuator-based application may in some embodiments take place by means of an actuator that is mechanically coupled, at least indirectly, to the steering handle. Said actuator may for example be an electric motor. For example, it may be a reaction force actuator of a steer-by-wire steering system. Said reaction force actuator may be coupled to the steering handle in order, for example, to apply steering torques that act counter to a steering movement of the driver and thus to deliver a specific steering sensation. In the case of electromechanical steering, the actuator may be an actuator which is coupled to the steering gear and by means of which a rack, for example, may be moved. On account of the preserved mechanical coupling between the steering handle and steering gear and in some embodiments, the actuator may also indirectly (for example by shifting the rack) apply torques to the steering handle.

In order for the steering torque to be perceptible on the steering handle, it may have a suitable minimum value in some embodiments, for example one which results in an at least slight rotation of the steering handle. Accordingly required magnitudes of the steering torque may in some embodiments be determined in advance, for example experimentally, by simulation, or by calculation.

For example, the applied steering torque for indicating the availability is generated in a predetermined manner. For example, it may always have the same magnitude or the same temporal progression. For example, it may also be generated in a repeatable manner (e.g., considered over multiple parking procedures). From the point of view of the driver, the corresponding steering torque (or progression of the steering torque) may thus be recognized as a clear signal for indicating the availability of the parking assistance function. This differs, for example, from the case in which an at least partially autonomous parking function starts to generate actuator-based steering torques for transverse guidance. Said steering torques typically depend on the current driving situation and, for example, on the steering angle to be set and therefore have no recognition value from the point of view of the driver or are not readily identifiable as clear signals for indicating the availability of a parking assistance function.

Therefore, according to some embodiments, at least a magnitude (optionally also direction) of the steering torque is applied irrespective of a current vehicle operating state and/or a current surrounding situation (of the vehicle). This differs from actuator-based application of steering torques for carrying out an at least partially autonomous parking procedure or for at least partially autonomous transverse guidance of the vehicle. In the latter case, the corresponding steering torque is adapted according to the situation in each case, for example depending on a travel speed and/or distances from objects in the surroundings.

For example, at least a magnitude (but optionally also the direction) of the steering torque may be applied irrespective of a current steering angle of the steering handle. Again, in this way, it may be provided that a recognizable steering torque is perceptible on the steering handle by the driver, one which signals the availability of the parking assistance function in as clear a manner as possible.

In principle, the additional steering torque may be configured to transversely guide the vehicle autonomously of the driver in some embodiments. In other words, it may have a sufficient magnitude to deflect a vehicle wheel in a desired manner. However, it is also possible for the additional steering torque to be chosen to have a lower magnitude and, for example depending on the current operating situation, not be sufficient to deflect a vehicle wheel while overcoming frictional forces, for example. The driver may then perceive the additional steering torque for example as a reduced steering resistance compared with other operating situations when manually actuating the steering handle, for example because the additional steering torque compensates at least in part for existing frictional or restoring forces.

In other words and in some embodiments, the additional steering torque may be used to at least temporarily reduce a steering resistance that exists from the point of view of the driver, for example with regard to deflections in the direction of the parking space. In contrast, a steering resistance alternatively or additionally for deflections directed away from the parking space may stay the same or not be reduced. For this purpose, an additional steering torque directed away from the parking space may be applied in some embodiments.

According to some embodiments, a predefined steering torque progression and/or a predefined steering torque pattern is applied. In both cases, this may relate to a temporal behavior of the steering torque or a temporal variability hereof. This is beneficial in that (as with the following pulse-like or jolt-like steering torques) the driver may receive haptic feedback from the steering handle even if active manual deflection has not yet begun. For example, the steering torque progression or steering torque pattern may cause a left-right movement of the steering handle in quick succession and/or cause same to vibrate.

In some embodiments, a pulse-like (and/or jerky) and/or jolt-like steering torque is applied. In this case, an actuator-generated steering torque is increased sharply (for example proceeding from zero), for example up to a predefined threshold. Subsequently, the steering torque may be reduced again for example immediately. An accordingly pulse-like or jolt-like steering torque, but also the above-mentioned patterns and progressions, have a high recognition potential from the perspective of the driver, since they may differ significantly from conventional feedback that is perceptible on the steering handle and/or from steering torques generated by means of actuators within the scope of autonomous transverse guidance.

In some embodiments, the pulse-like or jolt-like steering torque acts in the direction of a parking space. In other words, it is directed or signed such that the vehicle may be steered toward the parking space as a result.

According to some embodiments, a configuration option is provided, by means of which the driver may tie the indication or signaling of the parking assistance function according to any one of the preceding claims to at least one configurable condition. The condition may for example be location-dependent. The configuration option may for example be provided via a settings menu that may be called up by the user in the vehicle (for example may be called up and/or actuated via an infotainment system). By means of the configuration option, the driver is able to carry out the signaling of the parking assistance function according to any aspect described herein only in certain situations. For example, signaling according to a first of the aspects described herein may also be configured to take place in first situations (or if first conditions apply) and signaling according to a second, different aspect may also be configured to take place in second situations (or if second conditions apply). In other words, by means of the configuration option, the driver may thus for example define which signaling variants of the type described herein are to be executed in which situations or when which conditions are met.

For example, the condition may define the presence of the motor vehicle in a predefined area. This area may for example be defined by GPS coordinates and/or by distances from a predefined location. As a result, it is possible, for example, for signaling of the availability of the parking assistance function to be configured to be blocked in the vicinity of a frequently visited location (for example a place of residence or place of work) if, for example, there are private parking spaces for the driver in this location for which no assistance is required with regard to searching and/or parking.

Additionally or alternatively and in some embodiments, the presence of the motor vehicle in a predefined type of environment may be defined as a condition. In this case, preselectable types of environments may be defined and/or stored. For example, the environment may define a type of road traveled and/or the traffic situation. For example, the driver may stipulate that no signaling of the availability take place or that different signaling to that in parking garages or public parking lots (e.g., of a supermarket) take place on heavily used roads (for example multi-lane roads). In a busy environment (e.g., on multi-lane roads) for example, availability signaling by means of pulse-like steering torques may be perceived as distracting or unsafe. Instead, in these locations, additional steering torques that reduce the steering resistance may be used or haptic indication may be dispensed with completely. In parking garages or on public parking lots, the opposite may apply and a particularly clear indication of availability by means of pulse-like steering torques may be used.

Additionally or alternatively and in some embodiments, the condition may define the presence of the motor vehicle at or near to a current navigation destination. The proximity to the navigation destination may be definable, for example in the form of a predefined maximum distance (e.g., no more than 1 km). For example, it is possible in this way to set the signaling of the parking assistance function such that it only occurs at a corresponding proximity to the navigation destination but not beyond this point, since, in this case, it is likely that there is no desire to park.

A location dependency of the signaling may be defined in each case by means of the exemplary conditions mentioned above.

According to some embodiments, the steering torque acts in a defined direction (for example in the direction of a parking space, as already explained) and it is determined whether the driver is generating a manual steering torque in the same direction. If this is the case, the parking assistance function is for example activated for the purpose of providing assistance, i.e. said function generates autonomous steering torques, for example. In other words, the parking assistance function may only be switched on and for example generate supportive steering torques autonomously of the driver if the driver follows the initial steering torque for signaling availability. For example, the initial steering torque may thus serve as a steering recommendation in the corresponding direction and the parking assistance function may only be switched on if the driver follows this steering recommendation. If the driver does not follow this steering recommendation, the parking assistance function may then remain deactivated or generate no driver-autonomous steering torques.

Some embodiments relate to a motor vehicle comprising:
a steering handle;
an actuator (for example an electric motor of the type described above) coupled to the steering handle;
a control circuit, which is configured to actuate the actuator upon availability of support via a parking assistance function in order to at least temporarily apply at least one steering torque that may be perceived on the steering handle.

As already described, the control circuit may comprise at least one processor and/or at least one memory. The parking assistance function may be stored on the memory in the form of a software application, for example. Upon execution by the processor, the control circuit may provide the functions of the parking assistance function and carry out driver-autonomous transverse guidance, for example.

In general terms, the motor vehicle and for example the control circuit are configured to carry out a method according to any embodiment described herein. For example, the control circuit may actuate the actuator in order to apply steering torques in specific directions in the manner described above. Furthermore, the control circuit may be configured to check conditions that are predefined by means of configuration and that must be met in order for the signaling of the parking assistance availability to be able to take place by means of actuation of the actuator.

The motor vehicle and for example the control circuit may comprise any additional feature in order to provide any method measures, system states, and functions described herein. For example, all explanations and further developments on the method features may also be applied to the identical features of the motor vehicle and for example of the control circuit.

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

FIG. 1 shows a motor vehicle 10 according to one exemplary embodiment. The motor vehicle 10 is highly schematically simplified and is depicted in a plan view. Essential components of the motor vehicle 10 and for example a roof structure hereof have been omitted for illustrative purposes.

The motor vehicle 10 comprises a steering handle 12 in the form of a steering wheel. Said steering wheel is coupled to a steering gear 16, which comprises, among other things, a rack 18 that may move in a linear manner. An actuator 20 that may move the rack 18 is mechanically coupled to the rack 18. On account of the mechanical coupling between the steering handle 12 and the steering gear 16, the actuator 20 may generate torques that may be perceived on the steering handle 12 by moving the rack 18.

Since it is an electromechanical steering system in the case shown, the torques generated by the actuator 20 constantly also produce a steering effect on the vehicle wheels 22, or at least the vehicle wheels 22 of the front axle may be deflected by means of said torques. However, it is not strictly necessary for actuator-generated torques to actually produce a steering effect on the wheels 22. Instead, in the case of a steer-by-wire system, a torque that is perceptible on the steering handle 12 but that is not transmitted to the steering gear 16 may also be generated by means of a reaction force actuator. However, this is also referred to as a steering torque here, since, from the point of view of the driver, the corresponding torque is perceptible on the steering handle 12 or deflects the steering handle 12.

The vehicle 10 also comprises a control unit 26. Said control unit is connected to the actuator 20 so as to transmit data, as indicated by a dashed connection. In this way, the control unit 26 may actuate the actuator 20 such that same applies steering torques that may be perceived on the steering handle 12, i.e. there.

For example, the control unit 26 is connected to a communication bus (for example a CAN bus; not shown separately) of the vehicle 10. Via said communication bus, the control unit may for example receive any of the signals described below and/or determine vehicle states. Within the scope of this exemplary embodiment, the control unit 26 is configured to execute the parking assistance function and also to perform parking space recognition. However, this is not strictly necessary and these functions may also be provided by other control units.

In FIG. 1, the vehicle 10 is located on a public road 28 and is driving from left to right. By means of environment sensors (not shown separately), the vehicle has already started to search for parking spaces in the vehicle surroundings, for example on the right-hand side of the roadway as seen from the vehicle 10. A corresponding parking space 30 is marked between two parking vehicles 31 in FIG. 1. In the state shown, the vehicle 10 was stopped after recognizing the parking space and the driver signaled their desire to steer by engaging a reverse gear. The latter may be detected by the control unit 26, for example as the start of an assisted parking procedure or as said procedure being imminent. The control unit 26 may then optionally check whether a parking assistance function of the type described herein is available, i.e. may be activated, for example based on current environmental conditions or operating states. Even if such a parking assistance function is permanently available or activatable (e.g. without checking the surroundings), the availability or executability of the parking assistance function may be signaled to the driver in the manner described below as confirmation.

Figure 2:
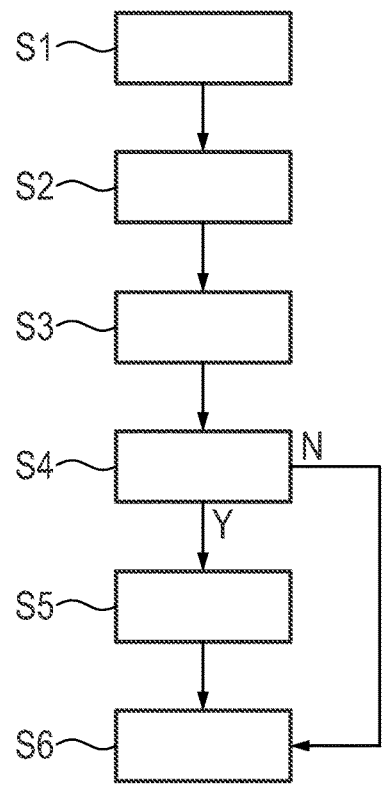
FIG. 2 shows an exemplary flow chart of the method carried out by the motor vehicle from FIG. 1.

FIG. 2 shows an exemplary flow chart of a method that may be carried out by the motor vehicle 10 and for example the control unit 26 thereof. In a step S1, a parking space 30 has been recognized autonomously of the driver and it is optionally checked whether a parking assistance function may currently be executed if its executability is tied to conditions. As another optional step S2, it is also initially checked whether the driver is actually signaling a desire to park, for example by stopping the vehicle 10 and/or engaging a reverse gear. In step S3, the possibility of support via the parking assistance function is signaled (if available) or its executability or availability is generally confirmed.

In contrast to the prior art, this is not done purely by outputting optical or acoustic signals, but rather by generating haptic feedback on the steering handle 12. For this purpose, the control unit 26 generates a predefined control signal for actuating the actuator 20. The actuator 20 then generates a torque of a predefined type and transmits same to the steering gear 16, whereupon the steering handle 12 is also deflected in a predefined manner and such that it may be haptically perceived by the driver, and/or its steering resistance is altered. For example, the control unit 26 does not generate a control signal and the actuator 20 does not generate a torque in consideration of current vehicle operating states, environmental conditions, or generally without taking into account situation-dependent parameters. Instead, a steering torque or steering torque progression of any type described above is generated on the steering handle 12 in a predefined manner irrespective of the situation.

In the present case, this takes place in such a way that the steering torque acts in the direction of the parking space 30, i.e. enables steering of the vehicle 10 along the dashed parking arrow E in FIG. 1. For example, a jolt-like deflection may take place in this direction, which the driver haptically perceives as a corresponding movement of the steering handle 12. If the driver then generates a manual steering torque in the corresponding direction, transverse guidance of the vehicle 10 may be carried out in an at least partially autonomous manner (optionally also longitudinal guidance). For example, actuator-based additional torques may then be generated at least at steering points in order to indicate to the driver suitable steering or required steering directions.

Accordingly, in the step S4, it is checked whether the driver is following the steering recommendation from the step S3 in the form of a jolt-like actuator-based steering torque. If this is the case (arrow Y), in the step S5, the parking assistance function is activated or continued and generates actuator-based steering torques that provide transverse guidance. If this is not the case (arrow N), a transition is immediately made to step S6 in order to terminate the method without the parking assistance function being activated and/or autonomous transverse guidance being performed in accordance with step S5.

It is not shown separately that the control unit may be configured in such a way that conditions of the type described in the general part of the description and that must be met in order for the availability to be signaled, for example by means of jolt-like steering pulses, may be stored in said control unit by the driver. If such a configuration option is provided, a separate check as to whether or not a corresponding condition has been met may take place prior to the step S3 in the method sequence.

LIST OF REFERENCE NUMERALS

10 Motor vehicle
12 Steering handle
16 Steering gear
18 Rack
20 Actuator
22 Vehicle wheel
26 Control unit
28 Road
30 Parking space
31 Parking vehicle
E Parking path The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for operating a motor vehicle for carrying out a parking procedure, wherein the motor vehicle comprises at least a parking assistance function to park the motor vehicle, and wherein the method comprises:
prior to a driving session, receiving, via a user input, a user selection of location-based parking assistance signaling conditions, each user-selected location-based parking assistance signaling condition specifying whether a haptic signaling to indicate the availability of the parking assistance function is enabled or disabled for a user-selected location, a user-selected type of road, or a user-selected type of traffic situation; and
during the driving session:
determining, by a control circuitry of the motor vehicle, a parking space for the motor vehicle;
determining a location of the parking space;
determining whether or not the parking assistance function is available depending at least on (a) the user-selected location-based availability conditions selected prior to the driving session and (b) the determined location of the parking space; and
performing the haptic signaling indicating the availability of the parking assistance function to a driver of the motor vehicle by at least temporary actuator-based application of at least one steering torque having a predefined magnitude on a steering handle that can be perceived by the driver, wherein the actuator-based application of the steering torque to indicate the availability of the parking assistance function to the driver is performed prior to an initiation of the parking assistance function.

2. The method of claim 1, wherein one or more of a predefined steering torque progression and a predefined steering torque pattern is applied.

3. The method of claim 2, wherein a pulse-like or jolt-like steering torque is applied, wherein the pulse-like or jolt-like steering torque acts in a direction corresponding with a direction of the parking space.

4. The method of claim 1, wherein a pulse-like or jolt-like steering torque is applied, wherein the pulse-like or jolt-like steering torque acts in a direction corresponding with a direction of the parking space.

5. The method of claim 1, wherein the predefined magnitude and a predefined direction of the at least one steering torque are applied irrespective of the current manual input on the steering handle.

6. The method of claim 1, comprising:
determining a direction of the parking space; and
applying the actuator-based at least one steering torque on the steering handle in a direction corresponding with the direction of the parking space.

7. The method of claim 1, comprising:
after indicating the availability of the parking assistance function to the driver by applying the at least one steering torque having the predefined magnitude on the steering handle, checking for a defined response by the driver;
automatically initiating the parking assistance function in response to detecting the defined response by the driver.

8. The method of claim 1, wherein receiving a user selection of location-based signaling availability conditions comprises receiving a selection of a frequently visited location by the user.

9. A motor vehicle comprising:
a steering handle;
an actuator coupled to the steering handle;
a user input configured to receive, prior to a driving session, a user selection of location-based parking assistance signaling conditions, each user-selected location-based parking assistance signaling condition specifying whether a haptic signaling to indicate the availability of the parking assistance function is enabled or disabled for a user-selected location, a user-selected type of road, or a user-selected type of traffic situation; and a control circuit, which is configured to, during the driving session:

determine a parking space for the motor vehicle;

determine a location of the parking space;

determine whether a parking assistance function is available depending at least on (a) the user-selected location-based availability conditions selected prior to the driving session and (b) the determined location of the parking space;

prior to initiating the parking assistance function, performing the haptic signaling indicating the availability of the parking assistance function to a driver of the motor vehicle by actuating the actuator to at least temporarily apply at least one steering torque having a predefined magnitude on the steering handle that can be perceived on the steering handle as an indication of availability of the parking assistance function, and subsequent to the haptic signaling indicating the availability of the parking assistance function to the driver by applying the at least one steering torque having the predefined magnitude on the steering handle, initiating the parking assistance function.

10. The motor vehicle of claim 9, wherein the control circuit is configured to:

determine a direction of the parking space; and apply the at least one steering torque in a direction corresponding with the direction of the parking space.

11. The motor vehicle of claim 9, wherein the control circuit is configured to:

after indicating the availability of the parking assistance function to the driver by applying the at least one steering torque having the predefined magnitude on the steering handle, check for a defined response by the driver; and automatically initiate the parking assistance function in response to detecting the defined response by the driver.

12. A method for operating a motor vehicle for carrying out a parking procedure, wherein the motor vehicle comprises at least one parking assistance function to park the motor vehicle, and wherein the method comprises:

prior to a driving session, receiving, via a user input, a user selection of location-based parking assistance signaling conditions, each user-selected location-based parking assistance signaling condition specifying whether a haptic signaling to indicate the availability of the parking assistance function is enabled or disabled for a user-selected location, a user-selected type of road, or a user-selected type of traffic situation;

determining a parking space for the motor vehicle;

determining a location of the parking space;

determining whether or not the parking assistance function is available depending at least on the user-selected location-based availability conditions and the determined location of the parking space;

performing the haptic signaling indicating the availability of the parking assistance function to a driver of the motor vehicle by actuator-based application of at least one steering torque on a steering handle that can be perceived by the driver; and after the actuator-based application of the at least one steering torque on the steering handle to indicate the availability of the parking assistance function to the driver:

checking for a defined response by the driver for initiating the parking assistance function; and automatically initiating the parking assistance function in response to detecting the defined response by the driver.

13. The method of claim 12, wherein the at least one steering torque is applied with a predefined magnitude irrespective of a current manual input on the steering handle.

14. The method of claim 12, wherein the at least one steering torque is applied with a predefined magnitude and a predefined direction irrespective of a current manual input on the steering handle by the driver.

15. The method of claim 12, comprising:

determining a direction of the parking space; and applying the actuator-based at least one steering torque on the steering handle in a direction corresponding with the direction of the parking space.

* * * * *